US010140168B2

(12) United States Patent
Höfig et al.

(10) Patent No.: US 10,140,168 B2
(45) Date of Patent: Nov. 27, 2018

(54) MAINTENANCE SYSTEM AND METHOD FOR A RELIABILITY CENTERED MAINTENANCE

(71) Applicant: SIEMENS AKTIENGESELLSCHAFT, München (DE)

(72) Inventors: Kai Höfig, München (DE); Francesco Montrone, Riemerling (DE)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 15/281,343

(22) Filed: Sep. 30, 2016

(65) Prior Publication Data

US 2017/0109219 A1    Apr. 20, 2017

(30) Foreign Application Priority Data

Oct. 15, 2015   (EP) ..................................... 15189989

(51) Int. Cl.
  *G06F 11/07*    (2006.01)
  *G06F 11/00*    (2006.01)

(52) U.S. Cl.
  CPC ........ *G06F 11/006* (2013.01); *G06F 11/0721* (2013.01); *G06F 11/0751* (2013.01)

(58) Field of Classification Search
  CPC . G06F 11/006; G06F 11/0721; G06F 11/0751

(Continued)

(56) References Cited

U.S. PATENT DOCUMENTS 6,742,000 B1 *   5/2004   Fantasia .............. G06F 11/2257
                                                701/29.4
7,280,925 B1 *  10/2007   Eker ..................... G06Q 10/06
                                                  700/99

(Continued)

FOREIGN PATENT DOCUMENTS

KR        20130118644 A      10/2013
WO     WO 2006039609 A2      4/2006

OTHER PUBLICATIONS

Extended European Search Report dated Apr. 4, 2016; Application No. 15189989.5; 7 pgs.

(Continued)

*Primary Examiner* — Kamini B Patel
(74) *Attorney, Agent, or Firm* — Schmeiser Olsen & Watts LLP

(57) ABSTRACT

A method for a reusable reliability centered maintenance of a technical system is provided, by executing the following steps: In a first step the meta data model is segmented in three sections to structure datasets of at least one database, wherein the first section comprises a collaborative dataset about components and at least one dominant failure mode associated with the components, the second section comprises a reusable dataset about at least one preventive maintenance task, the third section comprises a product dataset. In a second step at least one component instance is created for the third section by selecting at least one component of the components to describe said technical system. In a third step it is checked, if the preventive maintenance task is a valid task to prevent the dominant failure mode of the dominant failure mode instance for said technical system.

17 Claims, 6 Drawing Sheets

| C1 | C2 | C3 | C4 | C5 | C6 | C7 | C8 | C9 |
|---|---|---|---|---|---|---|---|---|
| Nr. | Type | Part | Circuit ID | Function | α | Failure Mode | Effect | % |
| 1 | Capacitor | 10nF/120V | C101 | smooth output | 10.00 | short circuit | amplification factor execeeds | 50% |
| | | | | | 10.00 | open circuit | limitations | 50% |
| | | | | | 10.00 | Copy this line | no effect | 0% |
| | | | | | 0.00 | Do not copy this line | | 100% |
| 2 | Resistor | 10kOhm | R305 | regulates amplification factor | 20.00 | short circuit | no effect | 50% |
| | | | | | 20.00 | open circuit | amplification factor execeeds | 50% |
| | | | | | 20.00 | Copy this line | limitations | 0% |
| | | | | | 00.00 | Do not copy this line | | 100% |

| C10 | C11 | C12 | C13 | C14 | C15 | C16 | C17 | C18 | C19 |
|---|---|---|---|---|---|---|---|---|---|
| safe | dang | * | $\lambda_s$ | $\lambda_d$ | $\lambda^*$ | Diagnosis | DCcomp | $\lambda_{du}$ | $\lambda_{dd}$ |
| 0 | 1 | 0 | 0,000 | 5,000 | 0,000 | Pulsed test will detect this failure | 90,0 | 0,50 | 4,50 |
| 0 | 0 | 1 | 0,000 | 0,000 | 5,000 | | 0,0 | 0,00 | 0,00 |
| 0 | 1 | 0 | 0,000 | 0,000 | 0,000 | | 0,0 | 0,00 | 0,00 |
| 0 | 0 | 1 | 0,000 | 0,000 | 10,000 | | 0,0 | 0,00 | 0,00 |
| 0 | 1 | 0 | 0,000 | 10,000 | 0,000 | Pulsed test will detect this failure | 90,0 | 1,00 | 9,00 |
| 0 | 1 | 0 | 0,000 | 0,000 | 0,000 | | 0,0 | 0,00 | 0,00 |

(58) Field of Classification Search
USPC .......................................................... 714/47.3
See application file for complete search history.

(56) References Cited

U.S. PATENT DOCUMENTS

| | | | | |
|---|---|---|---|---|
| 9,120,271 | B2* | 9/2015 | Bell | ................. B29C 70/10 |
| 2002/0143444 | A1* | 10/2002 | Sinex | ................. G06Q 10/025 |
| | | | | 701/29.3 |
| 2003/0149548 | A1* | 8/2003 | Mosses | ................. G06Q 10/08 |
| | | | | 702/184 |
| 2003/0210347 | A1* | 11/2003 | Kondo | ................. H04N 7/0145 |
| | | | | 348/383 |
| 2006/0184825 | A1* | 8/2006 | Regan | ................. G06Q 10/06 |
| | | | | 714/23 |
| 2010/0217638 | A1* | 8/2010 | Dickson | ................. G06Q 10/0631 |
| | | | | 705/7.23 |
| 2012/0209646 | A1* | 8/2012 | Montrone | ................. G06Q 10/0631 |
| | | | | 705/7.12 |
| 2012/0221190 | A1* | 8/2012 | Bell | ................. G06Q 10/06 |
| | | | | 701/29.1 |
| 2012/0221191 | A1* | 8/2012 | Bell | ................. F28G 1/08 |
| | | | | 701/29.1 |
| 2017/0109223 | A1* | 4/2017 | Hofig | ................. G06F 11/079 |

OTHER PUBLICATIONS

European Office Action dated Nov. 23, 2016, Application No. 15189989.5; 5 pgs.
International standards on dependability 60300—International Electrotechnical Commission.

* cited by examiner

FIG 1

| FIG 1A | FIG 1B |
|--------|--------|

FIG 1A

| Nr. | Type | Part | Circuit ID | Function | α | Failure Mode | Effect | % |
|-----|------|------|------------|----------|-----|--------------|--------|-----|
| | C1 | C2 | C3 C4 | C5 | C6 | C7 | C8 | C9 |
| 1 | Capacitor | 10nF/120V | C101 | smooth output | 10.00 | short circuit | amplification factor execeeds | 50% |
| | | | | | 10.00 | open circuit | limitations | 50% |
| | | | | | 10.00 | Copy this line | no effect | 0% |
| | | | | | 0.00 | Do not copy this line | | 100% |
| 2 | Resistor | 10kohm | R305 | regulates amplification factor | 20.00 | short circuit | no effect | 50% |
| | | | | | 20.00 | open circuit | amplification factor execeeds | 50% |
| | | | | | 20.00 | Copy this line | limitations | 0% |
| | | | | | 00.00 | Do not copy this line | | 100% |

FIG 1B

| C10 safe | C11 dang | C12 * | C13 $\lambda_s$ | C14 $\lambda_d$ | C15 $\lambda^*$ | C16 Diagnosis | C17 DCcomp | C18 $\lambda_{du}$ | C19 $\lambda_{dd}$ |
|---|---|---|---|---|---|---|---|---|---|
| 0 | 1 | 0 | 0,000 | 5,000 | 0,000 | Pulsed test will detect this failure | 90,0 | 0,50 | 4,50 |
| 0 | 0 | 1 | 0,000 | 0,000 | 5,000 | | 0,0 | 0,00 | 0,00 |
| 0 | 1 | 0 | 0,000 | 0,000 | 0,000 | | 0,0 | 0,00 | 0,00 |
| 0 | 0 | 1 | 0,000 | 0,000 | 10,000 | | 0,0 | 0,00 | 0,00 |
| 0 | 1 | 0 | 0,000 | 10,000 | 0,000 | Pulsed test will detect this failure | 90,0 | 1,00 | 9,00 |
| 0 | 1 | 0 | 0,000 | 0,000 | 0,000 | | 0,0 | 0,00 | 0,00 |

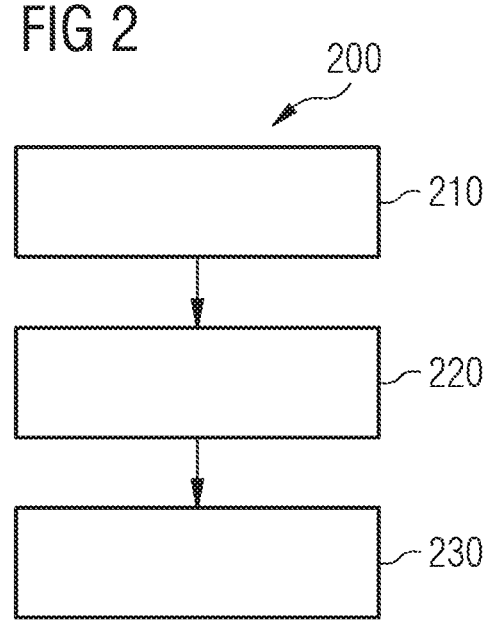

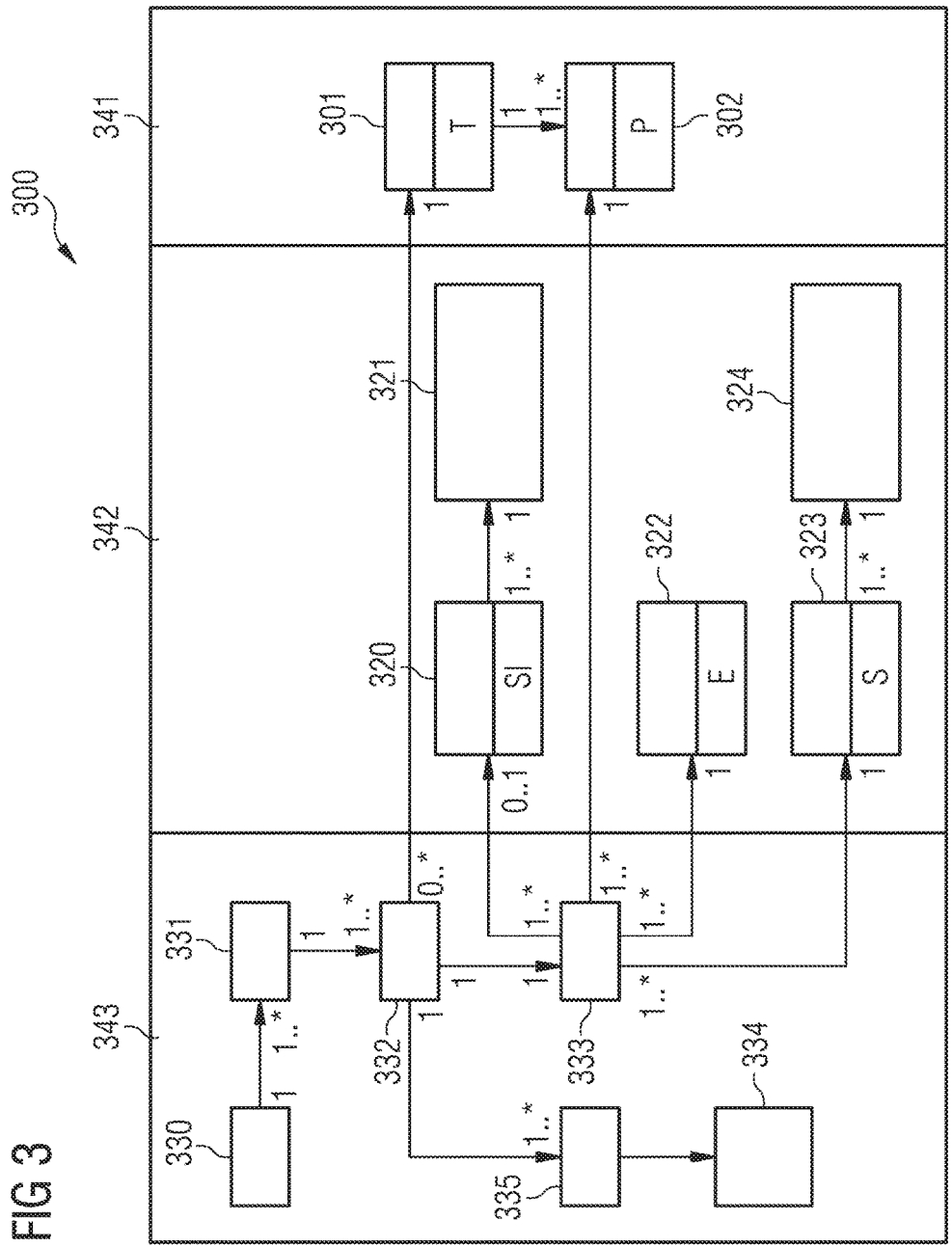

MAINTENANCE SYSTEM AND METHOD FOR A RELIABILITY CENTERED MAINTENANCE

CROSS-REFERENCE TO RELATED APPLICATIONS

This application claims priority European application No. EP 15189989.5 having a filing date of Oct. 15, 2015, the entire contents of which are hereby incorporated by reference.

BACKGROUND

The international standard IEC (International Electrotechnical Commission) 60300 defines reliability centered maintenance as a standardized methodology to improve maintenance effectiveness and to provide mechanisms for managing maintenance with a high degree of control and awareness. A functional failure analysis of a system is used to select maintenance tasks and to implement a reliability centered maintenance program. The Failure Mode and Effects Analysis (FMEA) examines the consequences of potential failures on the functionality of a system. Different variations of FMEAs are currently used in most domains to analyze critical systems. Since modern critical systems tend to increased complexity, automations and tool support have a long history in research and industry. Whereas compact embedded systems can be analyzed using FMEA in a manually maintained table, complex systems easily result in an unmanageable long table especially when larger development teams are involved.

SUMMARY

An aspect relates to a more flexible method and a maintenance system with reusable datasets for a reliability centered maintenance.

A system in context of this application is a technical system, for example a wind power station with several windmills or a manufacturing plant (e.g., automotive engineering). A subsystem can be a windmill of a wind power station or a production robot of a manufacturing plant.

Unless specifically stated otherwise, as apparent from the following discussions, it is appreciated that throughout the specification discussions utilizing terms such as "processing", "computing", "calculating", "determining", "generating", "configuring" or the like, refer to the action and/or processes of a computer that manipulates and/or transforms data into other data, said data represented as physical, e.g. such as electronic, quantities. The term "computer" should be expansively construed to cover any kind of electronic device with data processing capabilities, including, by way of non-limiting example, personal computers, servers, handheld computer systems, Pocket PC devices, Cellular communication device and other communication devices with computing capabilities, processors and microcontrollers (e.g. digital signal processor (DSP) possibly in combination with memory and storage units, application specific integrated circuit "ASIC", etc.) and other electronic computing devices.

The operations in accordance with the teachings herein may be performed by a computer specially constructed for the desired purposes or by a general purpose computer specially configured for the desired purpose or for the desired operations by a computer program stored in a computer readable storage medium.

A first aspect of the present disclosure provides a method for a reusable reliability centered maintenance of a technical system, wherein a processor computes a meta data model by executing the following steps:

A first step for segmenting the meta data model in a first section and a second section and a third section to structure datasets of at least one database, wherein
    the first section comprises a collaborative dataset about components and at least one dominant failure mode associated with the components,
    the second section comprises a reusable dataset about at least one preventive maintenance task,
    the third section comprises a product dataset, wherein the product dataset includes a system dataset about said technical system;

A second step for creating
    at least one component instance by selecting at least one component of the components to describe said technical system, wherein the system dataset is preferably associated with the at least one component instance,
    at least one dominant failure mode instance by combining the at least one dominant failure mode associated with the selected component with the at least one preventive maintenance task,
for the third section.

A third step for checking if the preventive maintenance task is a valid task to prevent the dominant failure mode of the dominant failure mode instance for said technical system.

The disclosed method is able to avoid inconsistency of maintenance tasks. In detail, the method avoids a misinterpretation of textually described maintenance tasks which leads to inconsistencies. Accordingly, the method preferably allows it to conduct an FMEA in an easy and timesaving manner.

Furthermore, an implementation of failure modes from field data is possible. Manually maintained long tables of complex systems make it nearly impossible to add new failure modes. During operation of a critical system new failure modes can appear, that were unknown at design time. These new failure modes can be incorporated in an existing analysis (e.g. FMEA). Moreover, field data (e.g., provided by sensors) can be processed automatically and added to the meta data model. For example, this can be accomplished by processing and adding the field data to the collaborative dataset and/or the reusable dataset and/or the system dataset.

In an embodiment of the method according to the first aspect the at least one dominant failure mode is only associated with one component of the components.

In another embodiment of the method according to the first aspect the at least one preventive maintenance task is associated with at least one failure management policy.

The disclosed method prevents possible inconsistencies of failure management policies. Failure management policies regulate the options to assign reliability centered maintenance tasks to failure effects in the analysis. If policies are not handled with great care and they become unmanageable. Arising inconsistencies in a manually maintained table become a problem if tasks are assigned to effects that do not comply with the failure management policy. The disclosed method avoids these inconsistencies which are easily introduced in a manually maintained analysis (e.g., a manually maintained FMEA).

In another embodiment of the method according to the first aspect the reusable dataset additionally comprises at least one failure mode management consequence and at least one system effect. Furthermore, the system effect is preferably associated with a component classification.

Each preventive maintenance task is related to a certain failure management policy that contains a set of parameters to be checked against the failure management consequence. Using the two elements, failure management policy and failure management consequence, it can be checked more precisely if the preventive maintenance task is a valid task to prevent the dominant failure mode instance.

In another embodiment of the method according to the first aspect the dominant failure mode instance is instantiated by additionally taking into account the at least one failure management consequence and the at least one system effect.

In another embodiment of the method according to the first aspect the at least one component instance additionally comprises at least one failure mode. Furthermore, the at least one failure mode is preferably associated with a local effect.

This information allows a more precise check if the preventive maintenance task is a valid task to prevent the dominant failure mode instance.

In another embodiment of the method according to the first aspect said system dataset comprises at least one subsystem and the at least one component instance describe the components of the subsystem.

The method is able to conduct an analysis of complex technical systems which can consist of a plurality of subsystems and components.

In another embodiment of the method according to the first aspect a recognition unit detects a new dominant failure mode for a component of the components and/or component instance. Furthermore, dominant failure mode is taken into account when checking if the preventive maintenance task is a valid task. Furthermore, the new dominant failure mode is preferably added to the collaborative dataset. Furthermore, the recognition unit is preferably at least one sensor.

Field data (e.g., provided by the sensor) can be processed automatically and added to the meta data model. For example, this can be accomplished by processing and adding the field data to the collaborative dataset and/or the reusable dataset and/or the system dataset.

In another embodiment of the method according to the first aspect the collaborative dataset is provided by a component database. Furthermore, the collaborative dataset preferably comprises a dataset about the technical system and at least a second technical.

The component database allows an efficient access to the collaborative dataset. In detail, meta data models for different systems can be computed. If a component of an meta data model is updated with a new dominant failure mode, other meta data models which use the same component and dominant failure modes can preferably be updated automatically.

In another embodiment of the method according to the first aspect the reusable dataset is provided by a first system database. Furthermore, the product dataset and/or the system dataset and/or the at least one component instance and/or the at least one dominant failure mode instance are preferable added to or provided by the first system database.

The first system database allows an efficient access to the reusable dataset. In detail, meta data models can reuse elements of the reusable dataset which were already acquired for a specific component. For example, if a technical system comprises several oil pumps of the same type, the same preventive maintenance task and the failure management policy are preferably used for all these oil pumps.

In another embodiment of the method according to the first aspect the meta data model is a first meta data model. Furthermore, the collaborative dataset is used by the first meta data model and at least by a second meta data model. Furthermore, the reusable dataset is preferably shareable between the first meta data model and at least the second meta data model. Furthermore, the product dataset and/or the system dataset and/or the at least one component instance and/or the at least one dominant failure mode instance are preferably shareable between the first meta data model and at least the second meta data model. Furthermore, the second meta data model preferably processes information of a second system database holding datasets describing the second technical system. Furthermore, the second meta data model preferably checks if the preventive maintenance task is a valid task to prevent the dominant failure mode of the dominant failure mode instance for the second technical system.

By sharing the reusable dataset and/or the collaborative dataset between meta data models and maintained technical systems, updates of meta data models can be distributed more easily.

In another embodiment of the method according to the first aspect the reusable dataset is reused by assigning it to at least one other dominant failure mode instance to preferably mitigate or prevent possible system effects associated with the at least one other dominant failure mode instance. Furthermore, the preventive maintenance task is preferably reused.

By sharing the reusable dataset and/or the collaborative dataset between meta data models and maintained technical systems, updates of meta data models can be distributed more easily.

In another embodiment of the method according to the first aspect the failure mode management consequence and/or the at least one system effect is reused.

A second aspect of the present disclosure provides a maintenance system to conduct reusable reliability centered maintenance for at least one specific technical system. The maintenance system comprises a processor to compute at least one meta data model. Furthermore, the maintenance system comprises a database unit to store at least one database, wherein the database unit and the at least one database are used to compute the at least one meta data model for the at least one specific technical system. Furthermore, the maintenance system comprises a segmenting unit for segmenting the meta model in a first section and a second section and a third section to structure datasets of the at least one database, wherein the first section comprises a collaborative dataset about components and at least one dominant failure mode associated with the components, the second section comprises a reusable dataset about at least one preventive maintenance task, the third section comprises a product dataset, wherein the product dataset includes a system dataset about said technical system.

Furthermore, the maintenance system comprises a creation unit to create at least one component instance by selecting at least one component of the components to describe said technical system, wherein the system dataset is preferably associated with the at least one component instance (332);

at least one dominant failure mode instance by combining the at least one dominant failure mode associated with the selected component with the at least one preventive maintenance task, for the third section.

Furthermore, the maintenance system comprises a validation unit to check if the preventive maintenance task is a valid task to prevent the dominant failure mode of the dominant failure mode instance for said specific system.

The creation unit and the validation unit preferably use the processor to create (or instantiate) elements for the meta data model (e.g., component instance or dominant failure mode instance).

In an embodiment of the method according to the first aspect the at least one database includes a component database. Furthermore, the at least one database includes preferably a first system database for the at least one specific system. Furthermore, the at least one database includes preferably a second system database preferably for the at least one specific system.

A further aspect of the present disclosure provides a computer program product storing executable instructions adapted to perform the method disclosed by the present disclosure. Furthermore, a providing apparatus is claimed for saving and/or providing a program data and/or instruction block of said executable instructions. The providing apparatus can be a data storage saving and/or providing the computer program product. Alternatively, the providing apparatus can be a computer system and/or a server system and/or a network and/or a cloud based computer system and/or virtual computer system. The providing apparatus saves and/or provides the computer program product. Preferably, the complete computer program product is provided by said providing apparatus in the form of a download, for example as a file or a data stream. Alternatively, the computer program product is provided by at least two partial downloads, for example provided by a peer to peer network, each containing a piece of said computer program product. For example such a computer program product can be provided by a data storage, which is read and executed by a computer system. As a consequence the computer system is able to execute the disclosed method.

A data storage or computer-readable medium can be electronic, magnetic, optical, or a semiconductor system (or apparatus or device). Examples of a computer-readable medium include, but are not limited to, a semiconductor or solid state memory, magnetic tape, a removable computer diskette, a random access memory (RAM), a read-only memory (ROM), a rigid magnetic disk, an optical disk, etc. Current examples of optical disks include compact disk-read only memory (CD-ROM), compact disk-read/write (CD-R/W) and digital versatile disk (DVD).

Further modifications and variations will emerge from the features of the dependent claims.

BRIEF DESCRIPTION

Some of the embodiments will be described in detail, with reference to the following figures, wherein like designations denote like members, wherein:

FIGS. 1A and 1B illustrate a manually maintained FMEA (or FMEDA) table;

FIG. 2 shows a chart for illustrating a first possible exemplary embodiment of a method for analyzing the functional failures of a system according to an aspect of the present disclosure;

FIG. 3 shows a diagram of a generalized meta data model according to an aspect of the present disclosure;

DETAILED DESCRIPTION

Figure 4:
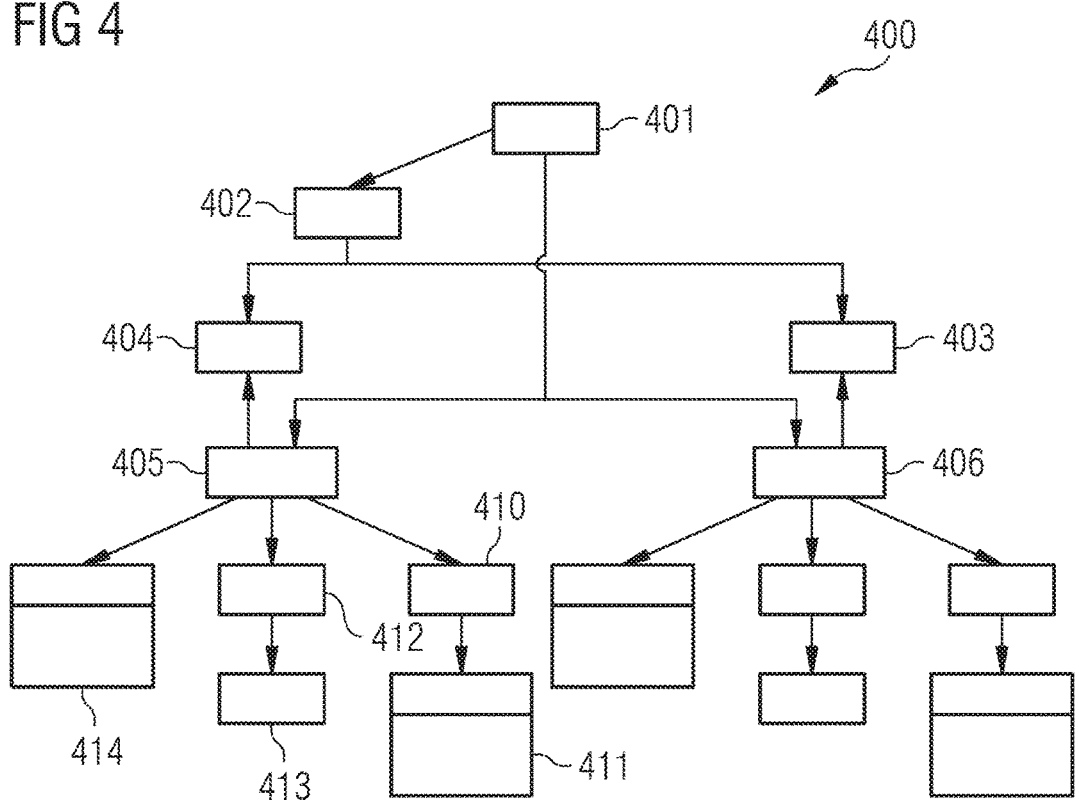
FIG. 4 shows a diagram of a specific meta data model used by the first embodiment according to an aspect of the present disclosure.

The accompanying drawings are intended to provide a better understanding of the embodiments. They show embodiments and serve in conjunction with the description to explain principles and concepts of the disclosed subject matter. Other embodiments and many of the cited advantages will emerge in respect of the drawings. The elements of the drawings are not necessarily shown in scale with one another. Identical reference characters here designate identical components or components of comparable effect.

FIG. 1 shows a simple manually maintained FMEA table 100 for a compact embedded system.

Failure mode and effects analysis (FMEA) is an inductive reasoning (e.g., forward logic) single point of failure analysis for safety critical systems. Failure mode and effects analysis are available in different variations for different applications, such as software or processes. Failure mode and effects analysis may be either qualitative or quantitative. The variations analyze failure modes of elements and the effects of the failure modes on the analyzed system. A generic quantified FMEA is described for a domain independent application of electrical/electronic/programmable electronic systems in the International Standard IEC 61508. Without the quantifications, the FMEA described therein is also generic for the qualitative variation of the analysis. The variation of FMEA described therein is referred to as a Failure Mode Effects and Diagnostic Analysis, or Failure Mode Effects and Diagnostic Coverage Analysis (FMEDA).

A FMEA (or FMEDA) as described in the above-referenced publication is typically developed using a manually maintained table with the support of a spreadsheet processing computer system. FIGS. 1A and 1B collectively show an example of a table from such a system. In column C1 of the table, the analyzed parts are numerated. Parts may be components or electronic devices. In column C2, the type of the analyzed part is indicated, e.g., a capacitor or resistor. In column C3, the electronic type of the part is indicated, e.g., the capacitor is a 10 nF/120V capacitor. In column C4, the identifier is used to identify the part in the specific system is indicated, such as an identification number of the electric circuit plan, e.g., CIOI for the capacitor.

In column C5, the function of the part is textually described. In column C6, the failure rate lambda is indicated, e.g., 10FIT (failure in time, $1*10^{-9}$ per hour) for the capacitor. Column C7 presents the failure modes of the part, such as two metal connectors of the capacitor may either short circuit or be damaged and in an open circuit state. Column C8 is used to describe a failure effect that corresponds with a failure mode. For example, if the capacitor is in an open circuit state, the failure has no consequences. Column C9 is used to allocate (e.g., split) the failure rate lambda (as indicated in column C6) to the individual failure modes. For example, the failure rate of 10FIT of the capacitor is equally split for the two failure modes of the capacitor. Columns C10 to C12 are used to categorize the failure effect into the categories "safe", "dangerous", and "disregard" (or "don't care"). Columns C13 to C15 calculate the residual failure rate for the specific failure effect and category (safe $\lambda_s$, dangerous $\lambda_d$, and disregard $\lambda^*$). For example, the failure rate $\lambda_d$ for the failure mode "short circuit" is 5FIT since $$10\text{FIT (column } C6)*50\% \text{ (column } C9)*1 \text{ (column } C11)=5\text{FIT}$$

The other columns are calculated accordingly. Column C16 is used to describe a possible diagnostic measure capable of detecting or mitigating a dangerous failure effect. For example, the failure effect corresponding to the failure mode "short circuit" of the capacitor is detected by a pulsed test signal. Column C17 indicates the effectiveness of that measure. For example, the pulsed signals that detect the dangerous failure effect of the open circuit failure mode of the capacitor may only detect or mitigate a fraction of 90% of the occurrences of that failure effect. Column C18 is used to calculate the residual failure rate that a dangerous failure effect goes undetected ($\lambda_d$ undetected, or $\lambda_{du}$). Column C19 is used to calculate the failure rate for the case that the dangerous failure effect is detected by the diagnostic measure ($\lambda_d$ detected, or $\lambda_{dd}$).

The manually maintained table of FIG. 1 may contain automation, such as when implemented in a spreadsheet application. The automation may calculate the values for the different failure rates or completeness of the percentages.

Because modern safety critical systems tend to increase complexity, automations and tool support have a long history in research and industry. Whereas compact embedded systems may be analyzed using FMEA in a manually maintained table, more complex systems may result in an unmanageably long table, such as when larger development teams are involved.

FIG. 2 shows a chart for illustrating a first possible exemplary embodiment of a method 200 for analyzing the functional failures of a system according to an aspect of the present disclosure.

The method 200 for a reusable reliability centered maintenance of a technical system uses a processor to compute a meta data model by the following steps. The meta data model is used to check if a preventive maintenance task is a valid task to prevent a dominant failure mode for the technical system.

In detail, in a first step 210 the meta model is segmented in a first section and a second section and a third section to structure datasets of at least one database, wherein
 the first section comprises a collaborative dataset about components and at least one dominant failure mode associated with the components,
 the second section comprises a reusable dataset about at least one preventive maintenance task,
 the third section comprises a product dataset, wherein the product dataset includes a system dataset about said technical system.

In a second step 220, the processor creates for the third section at least one component instance by selecting at least one component of the components to describe said technical system. In the second step, the processor also creates further instances for the third section. In detail, at least one dominant failure mode instance is created by combining the at least dominant failure mode associated with the selected component with the at least one preventive maintenance task.

In a third step 230 it is checked if the preventive maintenance task is a valid task to prevent the dominant failure mode of the dominant failure mode instance for said technical system.

FIG. 3 shows a diagram of a generalized meta data model 300 according to an aspect of the present disclosure. For example, this generalized meta data model 300 can be used by the embodiment according to the description of FIG. 2.

The diagram shows a meta data model to enable model-based semi-automatic reliability centered maintenance. This model-based semi-automatic reliability centered maintenance has the following advantages over a conventional FMEA:

The disclosed method is able to avoid inconsistency of maintenance tasks. In detail, the method avoids a misinterpretation of textually described maintenance tasks which leads to inconsistencies. Accordingly, the method preferably allows it to conduct an FMEA in an easy and timesaving manner.

Furthermore, an implementation of failure modes from field data is possible. Manually maintained long tables of complex systems make it nearly impossible to add new failure modes. During operation of a critical system new failure modes can appear, that were unknown at design time. These new failure modes can be incorporated in an existing analysis (e.g. FMEA). Moreover, field data (e.g., provided by sensors) can be processed automatically and added to the meta data model. For example, this can be accomplished by processing and adding the field data to the collaborative dataset and/or the reusable dataset and/or the system dataset.

Furthermore, an implementation of failure modes from field data is possible. Failure management policies regulate the options to assign reliability centered maintenance tasks to failure effects in the analysis. If policies are not handled with great care and they become unmanageable. Arising inconsistencies in a manually maintained table become a problem if tasks are assigned to effects that do not comply with the failure management policy. The disclosed method avoids these inconsistencies which are easily introduced in a manually maintained analysis (e.g., a manually maintained FMEA).

In detail, FIG. 3 shows the meta model for a FMEA analysis using generic parts and failure modes. It is segmented in a first section 341, in a second section 342 and in a third section 343 to structure datasets of at least one database provided by a database unit.

The meta data model 300 describes the elements of a RCM-enabled FMEA (reliability centered maintenance enabled FMEA) and their relations. A system dataset 330 (or an instance of a system element describing a technical system) can have at least one subsystem 331 which consist of at least one component instance 332. The at least one component instance 332 has a related component 301, at least one failure mode 335 and at least one dominant failure mode instance 333. The at least one Failure mode has at least one local effect 334. The at least one dominant failure mode instance 333 has at least one system effect 323. Additionally, the system effect 323 comprises a data field indicating its severity S. Each of the at least one dominant failure mode instances 333 relates to a dominant failure mode 302 of a specific component (e.g., the component 301). Additionally, the dominant failure mode 302 is associated with a failure probability P and the component 301 is associated with a component type T.

Since a system effect 323 is the reason for a component 301 to be classified as, for example critical, a system effect 323 is related to a component classification 324. Each dominant failure mode instance has a failure management consequence 322. This element carries local parameters, for example whether the dominant failure mode instance 333 is evident E during normal operations. So called preventive maintenance tasks 320 can be associated to dominant failure mode instances 333. Such tasks model preventive actions to prevent the dominant failure mode instance 333 of a component instance 332 to occur. Each preventive maintenance task 320 is related to a certain failure management policy 321 that contains a set of parameters to be checked against the failure management consequence 322 element. Using the two elements, failure management policy 321 and failure management consequence 322, it can be checked if the preventive maintenance task 320 is a valid task to prevent the dominant failure mode instance 333.

Furthermore, the mechanisms of instancing components (e. g., creating the component instance 332 based on the component 301) and dominant failure modes instances (e.g., creating the dominant failure mode instance 333 based on the dominant failure mode 302) enable adding new failure modes from field (e.g. an operating power plant) to a component (e.g. the component 301) of the collaborative dataset. If the set of dominant failure modes 302 of the component 301 is extended by another failure mode, existing component instances (for example the component instance 332) are preferably updated to have this failure mode referenced in their dominant failure mode instances (e.g., the dominant failure mode instance 333).

In other words, the first section 341 preferably comprises at least one collaborative dataset, the second section 342 comprises at least one reusable dataset and the third section 343 comprises at least one product dataset.

The collaborative dataset includes preferably a catalog of component elements (or components), wherein each component element (for example the component 301) of the component elements are preferably associated with at least one dominant failure mode element (for example the dominant failure mode 302). Additionally, the component element can preferably be associated with other non-dominant failure modes. The component elements of the catalog can describe the components of the technical system. Preferably, the component elements can describe the components of a plurality of a technical system.

The reusable dataset includes preferably preventive maintenance task elements (for example the preventive maintenance task 320), wherein each of the preventive maintenance task elements are preferably associated with at least one failure management policy element (for example the failure management policy 321). Furthermore, the reusable dataset includes at least one failure management consequence element (for example the failure management consequence 322) and at least one system effect element (for example the system effect 323), wherein the system effect element is preferably associated with at least one component classification element (for example the component classification 324).

Specific elements of the reusable dataset are preferably selected if a dominant failure mode instance element (for example the dominant failure mode instance 333) of the product dataset is instantiated. In detail, the dominant failure mode instance element is associated with a component instance element (for example the component instance 331) of the product dataset. The component instance is associated with at least one failure mode element (for example the failure mode 335) of the product dataset. The at least one failure mode element is preferably associated with at least one local effect element (for example the local effect 334) of the product dataset. The dominant failure mode instance element is preferably instantiated for a specific component (e.g., an oil pump or an oil filter) of the technical system. If the technical system comprises several identical components, the elements of the reusable datasets are used to instantiate several dominant failure mode instances for these identical components.

In detail, the elements of the reusable dataset can be used to describe efficiently the components of a technical system and its subsystems by reusing already acquired information (or datasets) which are stored in the elements of the reusable datasets. Preferably, the acquired information is updated by data provided by sensors. This updating can be done continuously or at preferably predefined moments.

Additionally, the elements of the collaborative dataset are preferably updated in an analogous manner like the reusable dataset. Here new dominant failure mode elements can be detected and processed for a component element.

After updating elements of the collaborative dataset and/or the reusable dataset, preferably all meta data models are updated. This means not only the meta data model of the technical system which acquired the sensor data is updated, but also other meta data models are updated which use the same component elements and dominant failure mode elements.

The product dataset includes the already above mentioned elements. Furthermore, the product dataset includes a system element (for example the system dataset 330) which describes a specific technical system (for example said technical system). The specific technical system can be a wind power plant or a water power plant. The system element associated with a subsystem element (for example the subsystem 331). The subsystem element is associated with at least one component instance element (for example the component instance 332).

In another embodiment the product dataset can be reused for an identically constructed technical system. Additionally, the elements of the product dataset are preferably updated in an analogous manner like the reusable dataset. Here new dominant failure mode instance elements can be detected and processed for a component instance element.

FIG. 4 shows a diagram of a specific meta data model 400 used by the first embodiment according to an aspect of the present disclosure. In detail, the meta data model 400 is used to analyze a simple system with one instance of a valve.

In detail, FIG. 4 shows how the meta data model for reliability centered maintenance, as described in FIG. 2 and FIG. 3, which can be used to analyze a system. In this example there is only one component instance present, therefore no system or subsystem component is depicted. The component instance central cooling water valve 401 is a two-way isolation valve component 402. The two-way isolation valve component 402 has two dominant failure modes, fails closed 404 and fails open 403. Accordingly, the component instance central cooling water valve 401 has two dominant failure mode instances, cooling water valve fails open 406 and cooling water valve fails closed 405 that are related to the corresponding dominant failure modes of the corresponding component.

This mechanism provides the feature of implementing failure modes from field data as described FIG. 2 and FIG. 3. If a new dominant failure mode of the two-way isolation valve 402 is observed in the field, it is added to the model. In this example, the component instance cooling water valve 401 has no dominant failure mode instance that relates to this new failure mode of the two way isolation valve 402. This inconsistency can easily be uncovered by programmatically analyzing the meta data model.

The component instance central cooling water valve 401 has no associated failure modes or local effects in this example. The dominant failure mode instance cooling water valve fails closed 404 has the system effect that the plant overheats 412. Therefore, the component is classified as critical 413. Therefore this dominant failure mode instance (cooling water valve fails closed 405) has an associated preventive maintenance task to check the valve every day 410.

This mechanism provides the advantage of overcoming the inconsistency of maintenance tasks as described in FIG. 2 and FIG. 3. The preventive maintenance task of checking the valve every day 410 becomes reusable as and can be associated to many different failure modes.

The severe failure management consequence 414 associated to the dominant failure mode instance cooling water valve failed closed 405 has two properties. First, the dominant failure mode instance is evident during normal operation. Second, the dominant failure mode instance is severe and decreased plant availability.

The dominant failure mode instance cooling water valve fails closed 405 is related to the preventive maintenance task check valve every day 410. The failure management policy 411 of this preventive maintenance task of daily inspections requires two properties. First, the dominant failure mode instance related to this preventive maintenance tasks has to be evident during normal operation. Second, the preventive maintenance task is suitable to prevent effects that decrease the plant availability. Since the properties of the failure management consequence related to the dominant failure mode instance and the failure management policy of the preventive maintenance task match, the preventive maintenance task of checking the valve every day 410 is a suitable preventive maintenance task to prevent the dominant failure mode instance cooling water valve fails closed.

This mechanism has the advantage to overcome the inconsistency of failure management policies as described in FIG. 2 and FIG. 3. The properties of failure management policies and failure management consequences can be defined for every domain where the reliability centered maintenance approach is implemented and then checked programmatically against each other.

The second dominant failure mode instance cooling water valve fails open 406 is handled analogous to the first dominant failure mode instance cooling water valve fails closed 405.

Figure 5:
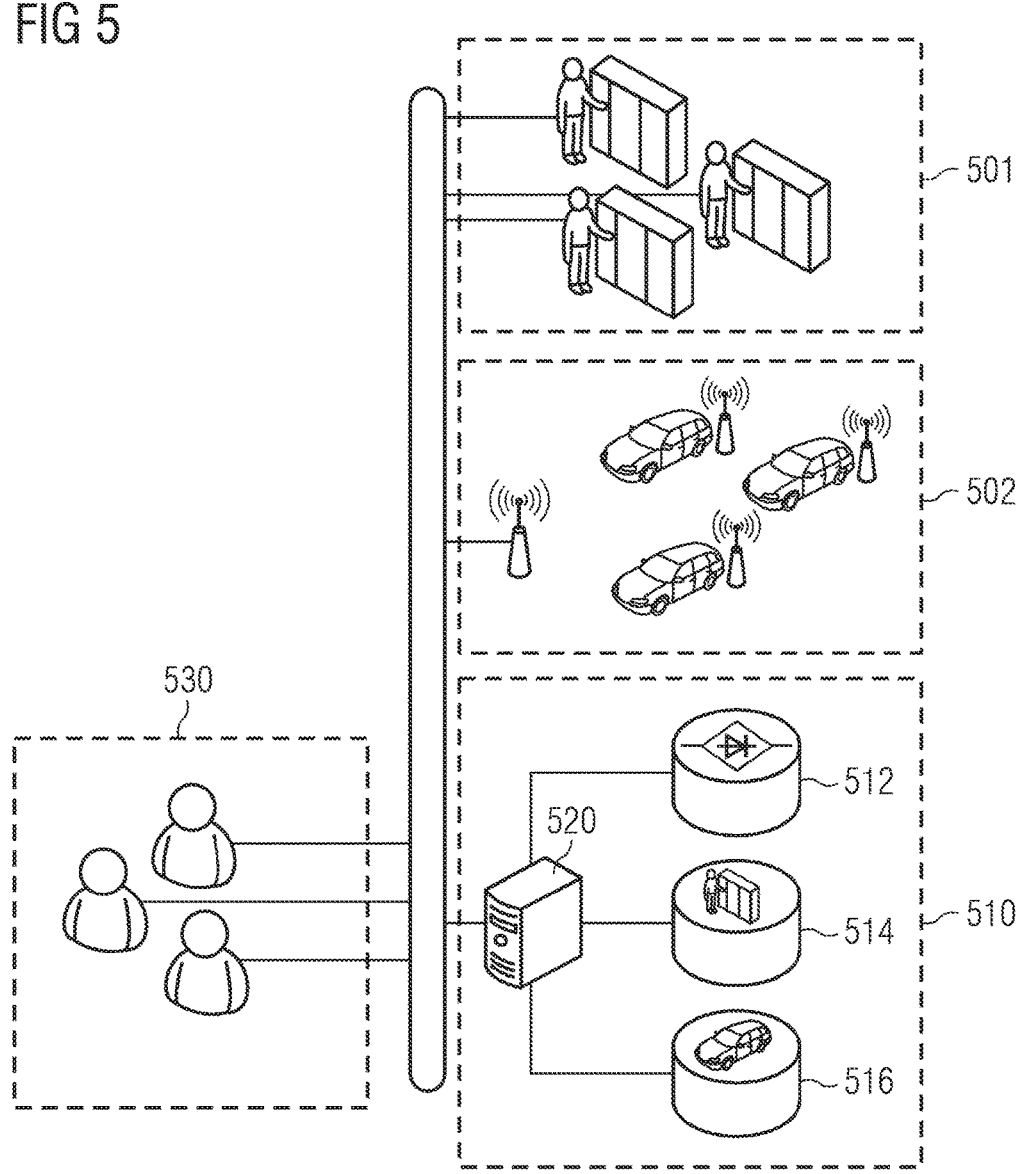
FIG. 5 shows a diagram for illustrating a maintenance system according to an aspect of the present disclosure.

FIG. 5 shows a diagram for illustrating a maintenance system 510 according to an aspect of the present disclosure.

In detail, FIG. 5 shows an exemplary implementation of the meta data model of the maintenance system 510 as described in FIGS. 2 and 3. In this example the maintenance system 510 is able to conduct a flexible FMEA for a first technical system 501 and a second technical system 502.

The maintenance system 510 conducts a reusable reliability centered maintenance for a specific system (e.g., the first technical system 501 or the second technical system 502), wherein a processor computes a meta data model as described in FIG. 2 to FIG. 4.

Additionally, the maintenance system comprises a database unit 520 to store for example a component database 512, a first system database 514 and a second system database 516. The database unit 520 and its databases are used to compute a first meta data model for the first technical system 501 and a second meta data model for the second technical system 502 as described in FIG. 2 to FIG. 4. The maintenance system 510 can have further system databases to compute further meta data models for further systems.

Additionally, the maintenance system 510 comprises a segmenting unit for segmenting the meta model in a first section and/or a second section and/or a third section, wherein
the first section comprises a collaborative dataset about components and at least one dominant failure mode associated with the components,
the second section comprises a reusable dataset about at least one preventive maintenance task,
the third section comprises a product dataset, wherein the product dataset includes a system dataset about said technical system.

Additionally, the maintenance system 510 comprises a creation unit to create
at least one component instance with the processor by selecting at least one component of the components to describe said specific system,
at least one dominant failure mode instance with the processor by combining the at least one dominant failure mode associated with the selected component with the at least one preventive maintenance task, for the third section; and Additionally, the maintenance system 510 comprises a validation unit to check if the preventive maintenance task is a valid task to prevent the dominant failure mode of the dominant failure mode instance for said specific system.

In detail, the meta model is used to structure the data in the database unit 520 (e. g. a database server). For example the data comprises the component database 512, holding components and dominant failure mode information, the first system database 514 holding reliability centered maintenance data for the first technical system 501 and the second system database 516 holding the data for the second technical system 502.

The stakeholders of analysis design and engineering 503 are connected via terminal applications to the databases of the maintenance system 510. If an engineer recognizes a new dominant failure mode in field or a system itself recognizes it, e.g. by recognition unit in the form of at least one sensor, this dominant failure mode is added to the corresponding component of the collaborative dataset in the component database. Scheduled checks will find a new dominant failure mode for component instances for the first technical system 501 and the second system 502. New reliability centered maintenance tasks can then be scheduled for the new dominant failure modes. Stakeholders from quality management can define failure management policies for the available tasks and prevent users from adding preventive maintenance tasks to dominant failure mode instances that are not allowed. All preventive maintenance tasks can be summarized automatically from the database and a preventive maintenance plan can be conducted for every system (e.g., the first technical system 501 and/or the second technical system 502).

I/O devices (including but not limited to keyboards, displays, pointing devices, etc.) can be connected to the maintenance system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters.

Although the present invention has been described in detail with reference to the preferred embodiment, it is to be understood that the present invention is not limited by the disclosed examples, and that numerous additional modifications and variations could be made thereto by a person skilled in the art without departing from the scope of the invention.

It should be noted that the use of "a" or "an" throughout this application does not exclude a plurality, and "comprising" does not exclude other steps or elements. Also elements described in association with different embodiments may be combined. It should also be noted that reference signs in the claims should not be construed as limiting the scope of the claims.

The invention claimed is:

1. A method for a reusable reliability centered maintenance of a technical system, wherein a processor computes a meta data model by executing the following steps:
 segmenting the meta data model in a first section and a second section and a third section to structure datasets of at least one database, wherein
  the first section comprises a collaborative dataset about components and at least one dominant failure mode associated with the components,
  the second section comprises a reusable dataset about at least one preventive maintenance task,
  the third section comprises a product dataset, wherein the product dataset includes a system dataset about said technical system;
 creating
  at least one component instance by selecting at least one component of the components to describe said technical system, wherein the system dataset is preferably associated with the at least one component instance;
  at least one dominant failure mode instance by combining the at least one dominant failure mode associated with the selected component with the at least one preventive maintenance task;
 for the third section;
 checking if the preventive maintenance task is a valid task to prevent the dominant failure mode of the dominant failure mode instance for said technical system;
 providing a recognition unit; and
  providing a new dominant failure mode for a component of the components and/or component instance based on a recognition of the recognition unit.

2. The method according to claim 1, wherein the at least one dominant failure mode is only associated with one component of the components.

3. The method according to claim 1, wherein the at least one preventive maintenance task is associated with at least one failure management policy.

4. The method according to claim 1, wherein
 the reusable dataset additionally comprises at least one failure mode management consequence and at least one system effect, and
 the system effect is associated with a component classification.

5. The method according to claim 4, wherein the dominant failure mode instance is instantiated by additionally taking into account the at least one failure management consequence and the at least one system effect.

6. The method according to claim 1, wherein
 the at least one component instance additionally comprises at least one failure mode, and
 the at least one failure mode is associated with a local effect.

7. The method according to claim 1, wherein said system dataset comprises at least one subsystem and the at least one component instance describe the components of the subsystem.

8. The method according to claim 1, wherein
 the new dominant failure mode is taken into account when checking if the preventive maintenance task is a valid task;
 the new dominant failure mode is preferably added to the collaborative dataset; and
 the recognition unit is at least one sensor.

9. The method according to claim 1, wherein
 the collaborative dataset is provided by a component database,
 the collaborative dataset preferably comprises a dataset about the technical system and at least a second technical system.

10. The method according to claim 1, wherein
 the reusable dataset is provided by a first system database;
 the product dataset and/or the system dataset and/or the at least one component instance and/or the at least one dominant failure mode instance are preferable added to or provided by the first system database.

11. The method according to claim 1, wherein
 the meta data model is a first meta data model;
 the collaborative dataset is used by the first meta data model and at least by a second meta data model;
 the reusable dataset is shareable between the first meta data model and at least the second meta data model;
 the product dataset and/or the system dataset and/or the at least one component instance and/or the at least one dominant failure mode instance are shareable between the first meta data model and at least the second meta data model;
 the second meta data model processes information of a second system database holding datasets describing the second technical system) and
 the second meta data model checks if the preventive maintenance task is a valid task to prevent the dominant failure mode of the dominant failure mode instance for the second technical system.

12. The method according to claim 1, wherein
 the reusable dataset is reused by assigning it to at least one other dominant failure mode instance to mitigate or prevent possible system effects associated with the at least one other dominant failure mode instance, and
 the preventive maintenance task is reused.

13. The method according to claim 4, wherein the failure mode management consequence and/or the at least one system effect is reused.

14. A maintenance system to conduct reusable reliability centered maintenance for at least one specific technical system, comprising:
 a processor to compute at least one meta data model;
 a database unit to store at least one database, wherein the database unit and the at least one database are used to compute the at least one meta data model for the at least one specific technical system;
 a segmenting unit for segmenting the meta model in a first section and a second section and a third section to structure datasets of the at least one database, wherein
  the first section comprises a collaborative dataset about components and at least one dominant failure mode associated with the components,
  the second section comprises a reusable dataset about at least one preventive maintenance task, the third section comprises a product dataset, wherein the product dataset includes a system dataset about said technical system;

a creation unit to create
- at least one component instance by selecting at least one component of the components to describe said technical system, wherein the system dataset is preferably associated with the at least one component instance;
- at least one dominant failure mode instance by combining the at least one dominant failure mode associated with the selected component with the at least one preventive maintenance task, for the third section;

a validation unit to check if the preventive maintenance task is a valid task to prevent the dominant failure mode of the dominant failure mode instance for said specific system;

providing a recognition unit; and providing a new dominant failure mode for a component of the components and/or component instance based on a recognition of the recognition unit.

15. The maintenance system according to claim 14, wherein the at least one database includes
- a component database,
- a first system database preferably for the at least one specific system, and
- a second system database preferably for the at least one specific system.

16. A computer program product storing executable instructions comprising a computer readable hardware storage device having computer readable program code stored therein, said program code executable by a processor of a computer system adapted to perform the method according to claim 1.

17. A providing device for the computer program product according to claim 16, wherein the providing device provides and/or saves the computer program product.

* * * * *